United States Patent Office 3,131,323
Patented Apr. 28, 1964

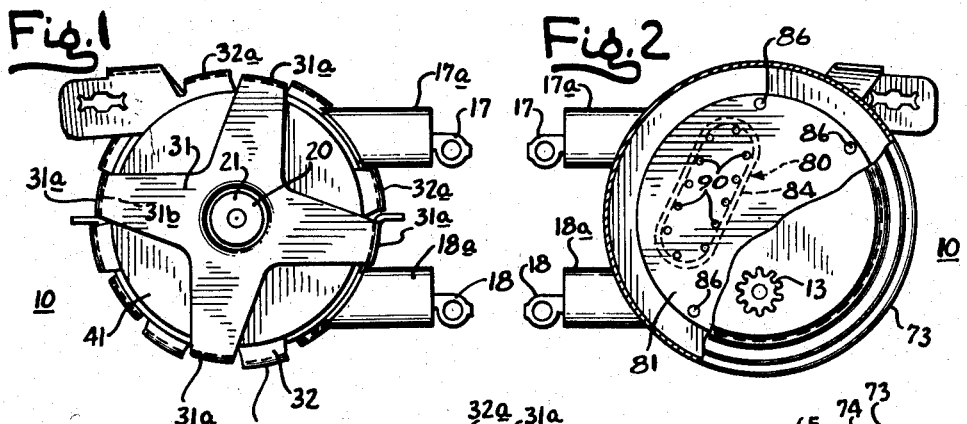
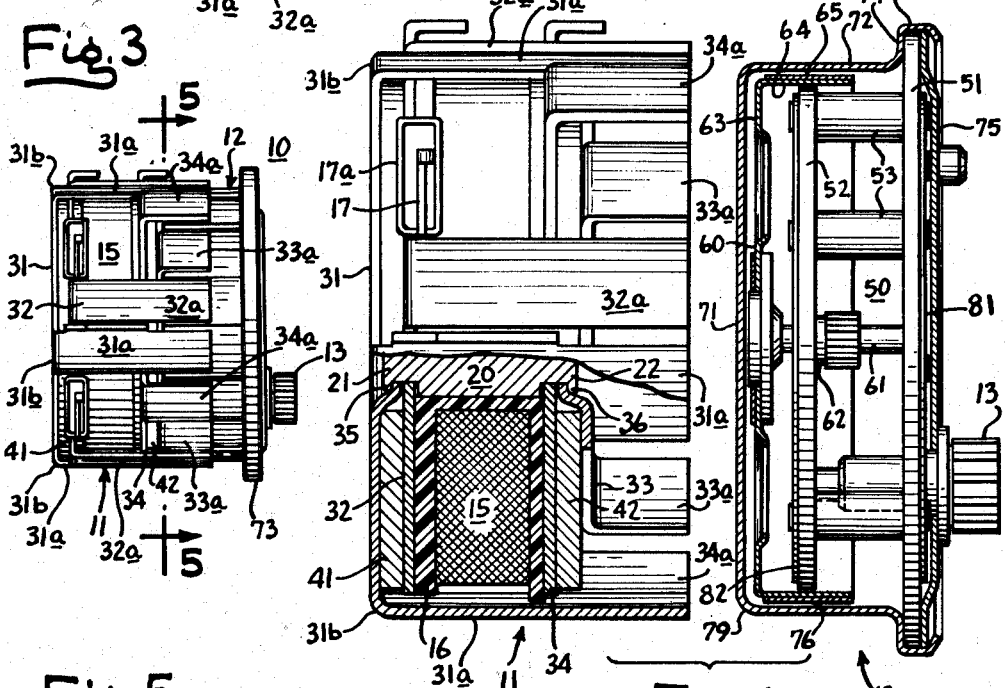
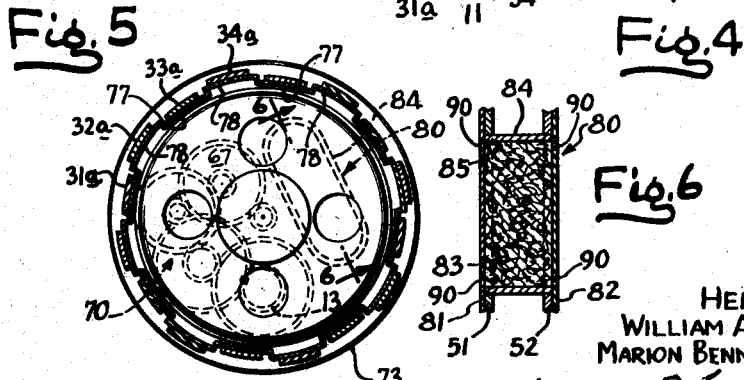
INVENTORS
HERBERT C. ROTERS
WILLIAM A. BLACK, DECEASED
MARION BENNETT BLACK, EXECUTRIX
ATTY.

3,131,323
SYNCHRONOUS MOTOR FOR CLOCKS
OR THE LIKE
Herbert C. Roters, Kew Gardens, N.Y., and William A. Black, deceased, late of Montclair, N.J., by Marion Bennett Black, executrix, Montclair, N.J., assignors to General Time Corporation, New York, N.Y., a corporation of Delaware
Filed July 7, 1960, Ser. No. 41,449
10 Claims. (Cl. 310—164)

The present invention relates to small synchronous motors for use with clocks and the like and more particularly to an improved structure for housing and lubricating the rotor and its associated gearing.

It is an object to provide a synchronous motor of the housed-rotor type which is magnetically efficient and which has novel means for automatically proportioning the shaded and unshaded flux so as to produce an optimum output torque characteristic. In this connection it is an object to provide a motor in which the magnetic poles and the rotor are included in two separate sub-assemblies but in which the poles are individually spaced an appropriate distance from the rotor incident to nesting the sub-assemblies together and without requiring any further pole adjustment. It is another object to provide a small synchronous motor of the above type in which any pole sub-assembly may be joined interchangeably with any rotor sub-assembly and which insures that optimum magnetic gaps are produced in the completed unit. Consequently it is an object to provide a motor which is easily and quickly assembled, which enables accurately reproducible characteristics to be obtained in production line manufacture and assembly, and which permits easy replacement of either sub-assembly when service becomes necessary or when a different gear ratio is required. It is another specific object of the invention to provide a small synchronous motor having the rotor enclosed in a thin-walled housing embraced by shaded and unshaded poles and in which the wall of the housing is stepped or fluted for reception of the poles and to space them individually at optimum distance from the rotor thereby to equalize the shaded and unshaded flux. In this connection it is detailed object to provide a motor made up of separable sub-assemblies and which insures proper angular orientation or register of one sub-assembly with the other when the parts are joined.

It is another object of the present invention to provide a small synchronous motor having novel means for housing the rotor thereof within the magnetic pole structure and for maintaining the rotating parts enclosed in the housing constantly bathed in oil vapor. It is another object to provide a novel lubricating arrangement for a small synchronous motor in which lubricant is conducted to the bearings of the rotor and gears by direct capillary action and in which means are provided for generating and maintaining oil vapor within the housing so that the gear teeth as well as the bearings are efficiently lubricated. It is a more specific object to provide a motor in which the rotating parts are compactly mounted in a separate housing and in which novel coupling is provided between the housing and the magnetic structure so that the warmth generated in the latter is fully available for vaporizing the oil within the housing. It is another specific but related object to provide a motor having a cylindrical motor and gear housing in which the pole pieces are biased into pressing engagement with the housing for good thermal and magnetic coupling.

It is a further object to provide a small synchronous motor which requires no care or maintenance over the life of the apparatus in which it is employed, permitting use in normally inaccessible locations or in other applications demanding the highest degree of reliability. In this connection it is an object to provide a motor which meets the most stringent military and commercial requirements but which is nevertheless simple and inexpensive to construct and which consists of a minimum number of parts simply formed and easily assembled together.

Other objects and advantages of the invention will become apparent upon reading the attached detailed description and upon reference to the drawing in which:

FIGURE 1 is a rear end view of a motor constructed in accordance with the present invention.

FIG. 2 is a front view of the motor of FIG. 1 with a portion of the front wall removed to reveal some of the internal construction.

FIG. 3 is a side view of the motor shown in FIGS. 1 and 2.

FIG. 4 is an enlarged sectional view showing the two sub-assemblies which comprise the motor in exploded relation.

FIG. 5 is a transverse section taken along the line 5—5 in FIG. 3.

FIG. 6 is a fragmentary cross section taken along the line 6—6 in FIG. 5.

While the invention has been described in connection with a preferred embodiment, it will be understood that we do not intend to be limited to the illustrated embodiment but intend to cover the alternative and equivalent constructions which are included within the spirit and scope of the appended claims.

Turning now to the drawings, the motor constructed in accordance with the present invention generally indicated at 10 includes a stator assembly 11 and a rotor assembly 12, the purpose of the stator simply being to produce a rotating field of magnetism to produce synchronous rotation of the rotor. Such rotation when stepped down in speed and stepped up in torque produces the slow, timed rotation of an output pinion 13.

For the purpose of creating an alternating magnetic field, an annular winding 15 is employed consisting of many turns of fine wire wound about a bobbin 16. The ends of the coil are brought out to terminals 17, 18, having insulating sleeves 17a, 18a. Mounted at the center of the bobbin is a core 20 of magnetic material having an outer end 21 and an inner end 22.

In order to conduct magnetism from the outer end of the core, a pair of spider members are provided having radially projecting legs which are bent at right angles to enclose and embrace the coil 15. The outermost spider member 31, taken as representative, has four legs which are bent over as at 31b to form a set of four magnetic poles 31a. Lying underneath the spider member 31 is the second spider member 32 having a set of four poles 32a occupying an angularly offset or twisted position with respect to the poles of the first spider member. Turning attention next to the inner end of the core member 20, a third spider member 33 is provided having legs which form a set of four magnetic poles 33a. And arranged adjacent the third spider member is a fourth spider member 34 having legs which form poles 34a which are offset from the poles 33a. In order to insure good magnetic coupling between the spider members and the core 20, the core is spun over at its ends as indicated at 35, 36 respectively.

For the purpose of offsetting the time phase of the magnetic flux in the paired spider members thereby to provide a shifting field, shading rings are interposed between the spiders. Thus, between the outer spiders 31, 32, a shading ring 41 is used which is of flat, annular shape and made of good conducting metal such as copper or aluminum. Since the shading ring 41 is effectively interposed between the source of magnetism and the magnetic poles 31a, the poles 31a may be referred to as "shaded" poles, while the poles 32a on the spider member 32 not affected by the presence of the shading ring, may be referred to as "unshaded" poles. Similarly, a shading ring 42 is interposed between the two spider members 33, 34 so that the poles 33a become the "shaded" poles and the poles 34a the "unshaded." The use of shading rings to produce shaded and unshaded flux in adjacent poles thereby to produce a moving field is per se known to those skilled in the art. Briefly stated, since the device is excited with alternating current flowing through the coil 15, the magnetism at any individual pole will vary in magnitude and direction sinusoidally in accordance with the exciting current. However, this varying flux tends to set up circulating eddy currents in the shading rings, the net effect of which is to delay the build-up of flux in the shaded poles as well as to delay the decrease of flux therein during the succeeding portion of the cycle. In short, the flux flowing in the shaded poles is offset or retarded in time phase. The maximum flux thus shifts from the unshaded poles to the adjacent shaded poles, and since all of the poles 31a–34a are uniformly offset from one another (see FIG. 5) and lie in a generally cylindrical locus, the effect of the shading ring is to produce a field which rotates continuously in a closed loop accompanied by synchronous rotation of the rotor.

Turning next to the rotor assembly 12 which is shown in FIG. 4 as separated from the stator assembly 11, it includes a frame 50 having a first frame plate 51 and a second frame plate 52 spaced from one another and separated by spacers in the form of posts 53. Centrally mounted within the frame is a rotor 60 having a spindle 61 riding in journal bearings 62. The rotor 60 will be recognized as conventional, having a central disc portion 63 and outer cylindrical flange portion 64 carrying a cylindrical strip 65 of permanently magnetic material. In operation, spots of magnetism are induced on the magnetic element 65 to form magnetic poles which are acted upon by the rotating field set up in the stator assembly. To produce a more useful speed-torque characteristic, a stepdown gear train 67 is used mounted between the two frame plates 51, 52, spindles of each of the gears being journaled in the frame plates. The final gear in the train drives the output pinion 13 which projects endwise from the motor and which is therefore accessible for meshing with a driven gear in a clock or other timing device.

In accordance with the present invention, the rotor frame 50 and rotor 60 are enclosed within a cylindrical housing of thin non-magnetic material with the poles pressed in intimate contact with the outside of the housing and with a source of vaporizable oil within the housing so that the moving parts are bathed by the enclosed vapor. Further in accordance with the invention the wall of the housing is not smooth but is on the contrary stepped or fluted for registered reception of the poles and to insure that the poles are maintained in precise radially spaced positions with respect to the rotor thereby tending to equalize the flux from the shaded and unshaded poles. Thus in the illustrated embodiment the housing generally indicated at 70 is of cup shape having a bottom portion 71 and a cylindrical wall 72. An outer flange 73 defines an annular ledge or recess 74 in which the frame plate 51 is seated to center the frame and rotor with respect to the housing. For the purpose of completing the enclosure, a dished cover plate 75 is provided in the form of a disc of the same size and contour as the frame plate 51. As shown in FIG. 4, the housing is sealed by spinning over the outer edge of the flange 73. The result is a rigid sub-assembly having predetermined clearance 76 between the rotor and the wall of the housing and with the unit being substantially sealed to prevent the escape of oil vapor. The preferred contour of the housing, clearly brought out in FIG. 5, is seen to consist of recessed and upraised portions in successive, rather sharply defined "square" flutes and remindful of a "square wave" encountered in electrical practice. The recessed portions indicated at 77 register with the shaded poles 31a, 33a while the upraised portions 78 serve to support the unshaded poles 32a, 34a. It will be recognized by one skilled in the art that because of the losses occurring in the shading ring the shaded flux will normally be of a lesser magnitude than the unshaded flux emanating from the same source. By spacing the shaded poles 31a, 33a in closer proximity to the rotor, the reluctance of the magnetic path defined by such poles is reduced. Consequently by proper choice of the relative radii of the recessed and upraised portions 77, 78 of the housing, the flux acting upon the rotor from the shaded and unshaded poles may be effectively equalized, producing a more uniform rotating field and consequently more uniform output torque over a complete revolution of the rotor.

In order to insure intimate contact between the magnetic poles and the outer surface of the housing and thus a precisely predetermined pole spacing when the rotor assembly is nested within the stator assembly, all of the poles 31a–34a are bent or sprung inwardly into a circular locus which is slightly smaller than the outer diameter of the housing. Moreover, the leading edge or corner of the housing 79 is formed with a smooth radius so that when the rotor assembly 12 is pressed into place the individual poles will tend to be cammed outwardly, riding into snug-fitting position on the outside of the housing. It will be apparent that the inward spring of the poles facilitates manufacture of the motor and reduces the need for adhering to close tolerances, and any stator assembly 11 is capable of receiving any rotor assembly 12 without individual adjustment. Moreover, the friction which results from the inward springing of the poles is sufficiently high that the rotor assembly is positively retained within the stator assembly for all normal usage yet the rotor assembly is capable of being removed by forceable withdrawal whenever it is desired to replace one of the sub-assemblies by another.

The particular mode of engagement of the two subassemblies is particularly advantageous where it is necessary to supply motors having different output speeds requiring a different gear ratio. Thus rotor assemblies may be separately stocked in a number of gear ratios along with "standard" stator assemblies. When an order is received, the desired rotor assemblies may simply be snapped into place thereby substantially reducing the number of stator assemblies which need be stocked. Moreover, if it becomes necessary to have a different output speed in the case of a motor already in service, it is a simple matter to replace the rotor assembly 12 with one having the desired gear ratio and without necessity for replacing the entire motor. Because of the engagement of the poles with the flutes, accurate register is assured so that the output pinion will be automatically in the correct position for meshing with the driven gear on the associated apparatus.

In accordance with one of the aspects of the invention a novel oil reservoir is provided between the frame plates of the rotor assembly together with capillary means for conducting oil from the reservoir to the rotor bearings and to the spindles of the various gears in the stepdown driving train. More specifically, capillary plates are provided on each of the frame plates and in contact with oil-saturated wicking between the plates so that oil is drawn from the wicking by capillary action into the interface between the frame plates and their associated capillary plates to provide direct flow of oil to the rotating spindles. In the present embodiment the lubricating arrangement generally indicated at 80 (FIG. 6) includes a first capillary plate 81 secured to the outside surface of the plate 51 and a second capillary plate 82 secured to the plate 52 in like manner. The oil saturated wicking 83 is arranged between the plates with a small oval shaped enclosure 84. The two frame plates 51, 52 are cut out or apertured for the snug reception of the peripheral edges of the enclosure 84 as shown in FIG. 6. This insures that there is direct contact between the wicking 83 and what may be termed the "feed junction" 85 between the capillary plates and their associated frame plates. It will be apparent, then, that oil passes through the feed junction 85 spreading over the entire undersurface of the capillary plates and to the journal bearings mounting the spindles of the gears and pinions. It is found that proper contact between the capillary plates and the associated frame plates is achieved by riveting the members together using widely spaced rivets 86 at the periphery of the capillary plates.

In order to permit free discharge of oil vapor from the reservoir into the enclosed space, the portion of the capillary plates overlying the wicking includes perforations 90 arranged in any desired pattern.

It is found that the above arrangement produces a motor which cannot be "dried out" but which remains efficiently lubricated over the life of the device in which it is used. Thus oil is not only directly conducted to the points of wear in a continuous and adequate supply but also the oil vapor which is generated within the housing and held captive therein coats all of the surfaces, including the meshing surfaces of the gears and pinions preventing any noticeable wear of the gears over many thousands of hours of operation. As stated, the intimate contact between the poles and the outer surfaces of the housing not only insures magnetic efficiency but also insure that the small amount of heat which is liberated by the coil 15 is efficiently conducted to the housing, warming the housing and the enclosed oil reservoir and generating oil vapor therein. It is found that the light non-gumming machine oil normally employed for horological devices is capable of producing adequate vapor at relatively low temperature level; consequently the device works as intended even though the coil 15 may have a rating of only 1 watt or less. When the motor is shut down, the housing tends to cool because of its extensive surface so that the oil vapor tends to condense thereon. When the motor is reenergized, the heat from the coil is immediately transmitted to the wall of the housing so that the condensed oil is promptly re-vaporized. As a result lubrication efficiency is high whether the motor is used on a continuous or intermittent basis.

It is, of course, desirable for the wall thickness of the housing to be a minimum so that the effective air gap may be minimized while providing adequate clearance in the space 76 between the rotor and the sidewall of the housing. It is found that when using the notched or fluted wall construction it is possible to provide a housing which is strong and rigid employing non-magnetic materials which are only a fraction of the thickness which would otherwise be required. That is to say, it is possible while employing the present invention to use aluminum stock having a wall thickness in the drawn condition as little as five thousandths of an inch. It is found that by forming the wall of the housing with the square-edged flutes a high degree of lateral stiffness is achieved so that the housing is able to resist any sidewise deformation even when subjected to substantial blows or stresses. Moreover, the fluted construction substantially reduces the possibility that the housing will be dented since the portions of the housing 77 which are closest to the rotor are recessed within the outer diameter of the housing and thus protected from harm. In short, a unit constructed as above insures freedom of movement of the rotor even when using design clearances on the order of a few thousandths of an inch. This in turn insures a high degree of reliability of the motor itself permitting the motor to be employed in inaccessible locations or in exacting military and commercial applications.

It will be apparent that the motor is of simple construction and formed of a minimum number of parts easily fabricated and assembled under production line conditions.

It is claimed:

1. In a synchronous motor for use in clocks or the like the combination comprising a plurality of magnetic poles arranged parallel to one another in a cylindrical locus and defining a hollow cylindrical receptacle between them, exciting means including a winding and a shading ring associated with the poles so that the poles are alternately shaded and unshaded to set up a rotating magnetic field, a generally cylindrical housing having a rotor and dimensioned to fit in the cylindrical housing with the poles positioned adjacent the rotor, said poles being biased inwardly toward the axis so that each of the poles bears resiliently against the outer cylindrical surface of the housing, said housing being made of thin non-magnetic material formed into flutes of squarish cross section for registered reception of the shaded ones of the poles.

2. In a synchronous motor for use in clocks or the like the combination comprising a plurality of magnetic poles arranged parallel to one another in a cylindrical locus and defining a hollow cylindrical receptacle between them, exciting means including a winding and a shading ring associated with the poles so that the poles are alternately shaded and unshaded to set up a rotating magnetic field, a generally cylindrical housing having a rotor and dimensioned to fit in the cylindrical housing with the poles positioned adjacent the rotor, means for pressing the poles inwardly toward the axis so that each of the poles bears against the housing, said housing being made of thin non-magnetic material having alternate ridges and grooves for registered reception of the poles, a gear train in said housing and coupled to the rotor, a source of oil in said housing, and means for substantially sealing the housing so that any warmth conducted thereto by the poles is effective to promote the formation of oil vapor therein.

3. In a synchronous motor for use in clocks or the like the combination comprising an annular coil, a pair of spider members on each side of the coil and having their legs bent at right angles to the body portions thereof to form a series of cantilevered poles lying in a generally cylindrical locus, a shading ring interposed between the poles comprising each of the pairs so that the poles thus formed are alternately shaded and unshaded to set up a rotating magnetic field, a generally cylindrical housing having a rotor and dimensioned to fit within the cylindrical locus of the poles, said poles being sprung radially inward so that each of the poles bears resiliently against the outer surface of the housing thereby to establish intimate contact with the housing and predetermined spacing of the poles with respect to the rotor.

4. In a synchronous motor for use in clocks or the like the combination comprising a pole structure including a series of shaded and unshaded poles arranged in a generally cylindrical locus and having a coil for exciting the same, a rotor sub-assembly including a generally cylindrical housing having a rotor and dimensioned to fit within the cylindrical locus of the poles, said poles being sprung radially inward so that each of the poles bears resiliently against the outer surface of the housing, the housing having a stepped contour for maintaining the shaded and unshaded poles at predetermined spacings relative to the rotor.

5. A synchronous motor for use in a clock or the like comprising the combination, an annular coil, a pair of spiders of magnetic material on each side of the coil having legs bent at right angles to form a series of poles lying in a generally cylindrical locus, a shading ring interposed between the poles comprising each of the pairs so that the poles are alternately shaded and unshaded to set up a rotating magnetic field, a generally cylindrical housing having a rotor mounted for rotation therein and a source of vaporizable oil, said housing being dimensioned to nest snugly within the poles for magnetic coupling of the rotor and the poles with the poles in pressing engagement with the wall of the housing.

6. A synchronous motor for use in a clock or the like comprising the combination, an annular coil, a pair of spiders of magnetic material on each side of the coil having legs bent at right angles to form a series of poles lying in a generally cylindrical locus, a shading ring interposed between the poles comprising each of the pairs so that the poles are alternately shaded and unshaded to set up a rotating magnetic field, a generally cylindrical housing of thin non-magnetic material having a rotor mounted for rotation therein and enclosing a source of vaporizable oil, said housing having an outer surface for nesting snugly within the poles and for supporting the same at predetermined distances from the rotor.

7. A synchronous motor for use in a clock or the like comprising the combination, an annular coil, a pair of spiders of magnetic material on each side of the coil having legs bent at right angles to form a series of poles lying in a generally cylindrical locus, a shading ring interposed between the poles comprising each of the pairs so that the poles are alternately shaded and unshaded to set up a rotating magnetic field, a generally cylindrical housing of thin non-magnetic material having a rotor and gear train mounted for rotation therein and a source of vaporizable oil, said housing being dimensioned to nest snugly within the poles, the wall of the housing being fluted for registered reception of the poles and for maintaining them at predetermined relative distances from the rotor.

8. A synchronous motor for use in clocks and the like comprising in combination, an annular coil, a pair of spiders of magnetic material on each side of the coil and having their legs bent at right angles to form a series of poles lying in a generally cylindrical locus, a shading ring interposed between the poles comprising each of the pairs so that the poles are alternately shaded and unshaded to set up a rotating magnetic field, a rotor sub-assembly including a pair of frame plates having a rotor and gear train mounted therein and having an enclosing shell of thin non-magnetic material, said shell being dimensioned to nest snugly within the poles for magnetic coupling between the coil and the shell, an oil reservoir including wicking arranged between the frame plates and vented into the space within said shell for bathing the rotating parts in oil vapor, said shell being sealed to prevent escape of the vapor.

9. A synchronous motor for use in clocks and the like comprising the combination, an annular coil, a pair of spiders of magnetic material on each side of the coil and having their legs bent at right angles to form a series of poles lying in a generally cylindrical locus, a shading ring interposed between the poles comprising each of the pairs so that the poles are alternately shaded and unshaded to set up a rotating magnetic field, a rotor sub-assembly including a pair of frame plates having a rotor and gear train mounted therein and having an enclosing shell of thin non-magnetic material, said shell being fluted to register snugly within the poles for magnetic coupling between the poles and the rotor and to provide intimate coupling between the coil and the shell, an oil reservoir in said frame plates and vented into the space within said shell for bathing the rotating parts in oil vapor.

10. In a synchronous motor for use in an electric clock or the like the combination comprising a magnetic pole assembly including a coil for setting up a rotating field, a rotor frame including a pair of frame plates spaced from one another and mounting a rotor in said field, a gear train including gear wheels meshing with one another and journaled between said frame plates, an oil enclosure between said frame plates and substantially filled with oil-saturated wicking, capillary plates lying flatly adjacent said frame plates to define oil-conducting interfaces, said oil enclosure having a wall which extends to said interfaces at its respective peripheral edges to define feed junctions therewith, said wicking being in oil-conducting contact with said feed junctions so that lubricant is drawn from the wicking into the interface between each capillary plate and its associated frame plate for direct capillary conduction of oil to the bearings of the rotor and individual gears, a sealed housing surrounding the rotor and frame plates, and means permitting escape of oil vapor from the wicking and into the space surrounding the rotor and gears for vapor lubrication of the gear teeth.

References Cited in the file of this patent

UNITED STATES PATENTS

| | | |
|---|---|---|
| 1,456,082 | Warren | May 22, 1923 |
| 1,495,936 | Warren | May 27, 1924 |
| 2,292,265 | Carpenter | Aug. 4, 1942 |
| 2,502,830 | Crise | Aug. 4, 1950 |